United States Patent [19]

Delbianco et al.

[11] Patent Number: 5,690,176
[45] Date of Patent: Nov. 25, 1997

[54] COMPOSITION EFFECTIVE IN REMOVING ASPHALTENES

[75] Inventors: Alberto Delbianco, Magenta; Fabrizio Stroppa, S. Giuliano Mil.Se, both of Italy

[73] Assignee: Agip S.p.A., Milan, Italy

[21] Appl. No.: 615,535

[22] Filed: Mar. 12, 1996

[30] Foreign Application Priority Data

Apr. 7, 1995 [IT] Italy ................... MI95A0711

[51] Int. Cl.⁶ ...................... E21B 37/00; E21B 43/12
[52] U.S. Cl. .................. 166/304; 166/312; 507/242; 507/263; 507/930
[58] Field of Search ................. 166/304, 312, 166/371; 507/239, 242, 263, 264, 930

[56] References Cited

U.S. PATENT DOCUMENTS

| | | | |
|---|---|---|---|
| 2,419,755 | 4/1947 | Albaugh | 507/242 |
| 3,172,473 | 3/1965 | Crowley et al. | |
| 3,914,132 | 10/1975 | Sutton | 507/242 X |
| 3,941,192 | 3/1976 | Carlin et al. | 166/304 |
| 4,033,784 | 7/1977 | Lawson et al. | |
| 4,090,562 | 5/1978 | Maly et al. | 166/304 |
| 4,207,193 | 6/1980 | Ford et al. | 166/304 X |
| 4,648,543 | 3/1987 | Hermann | |
| 5,382,728 | 1/1995 | Del Bianco et al. | 585/24 |
| 5,438,039 | 8/1995 | Del Bianco et al. | 507/203 |
| 5,504,063 | 4/1996 | Becker et al. | 166/304 X |

FOREIGN PATENT DOCUMENTS

| | | |
|---|---|---|
| 844998 | 8/1939 | France . |
| 94/19575 | 9/1994 | WIPO . |

*Primary Examiner*—George A. Suchfield
*Attorney, Agent, or Firm*—George P. Hoare, Jr.; Rogers & Wells

[57] ABSTRACT

Process for the dissolution of asphaltene sediments in oil wells which consists in introducing a solubilizing composition for the above asphaltenes into the oil wells, characterized in that the solubilizing composition comprises:

(a) a basically hydrocarbon fraction consisting of at least 70%, preferably at least 80% by weight, of aromatic and alkyl aromatic hydrocarbons, the alkyl group being from $C_1$ to $C_4$;

(b) a fraction basically consisting of quinoline and isoquinoline as such or alkyl substituted, preferably as such, the alkyl group being from $C_1$ to $C_4$; the weight ratio between fraction (a) and (b) being from 97.5/2.5 to 75/25, preferably from 97/3 to 90/10.

8 Claims, No Drawings

COMPOSITION EFFECTIVE IN REMOVING ASPHALTENES

The present invention relates to a mixture which can be used for the dissolution of asphaltene residues and the process for treating oil wells with the above mixture, to remove these residues, as well as heat exchangers and all the equipment used in the production phase of petroleum.

Oil is a complex mixture of paraffinic, cycloparaffinic and aromatic hydrocarbons in which there are components which have a wide range of properties: varying in fact from extremely fluid liquids to waxy solids and very viscous tars.

Asphaltenes are predominant among the solid or extremely viscous components. They consist of a mixture with a varying composition of condensed aromatic and heteroaromatic polycyclic compounds.

Owing to the presence of various metals and heteroatoms such as oxygen, nitrogen and sulfur, asphaltenes are among the most polar components of oil.

In crude oil the asphaltene molecules tend to form aggregates of different units depending on the characteristics of the asphaltenes and oil in which they are dissolved.

The recovery of the oil contained in geological formations is often hindered by the presence of solid asphaltene sediments. In fact, during the exploitation of an oil well, asphaltene compounds with a high molecular weight may often precipitate together with waxy solids.

These solids tend to obstruct the pores of the oil rock reserve and also block the well-casings, pipes and other equipment used in the drilling of wells. There is consequently a reduction in the productivity of the well and in extreme cases the total loss of the well production.

Various methods are known which can be used for removing the above solid sediments, for example mechanical scratching, treatment with hot oil, treatment with water solutions of surface-active agents. The most widely used technique however consists in the use of organic solvents capable of dissolving the above asphaltene sediments.

For this purpose the solvents which are generally most widely used are light aromatic hydrocarbons, for example benzene, toluene and xylene.

In addition to their high cost, these solvents have very serious disadvantages related to their high volatility and low flash point. But above all, the above aromatic compositions are not highly satisfactory owing to their low capacity of dissolving the asphaltene residues and also due to the rather low dissolution kinetics of these.

A decidedly more effective solvent is described in U.S. Pat. No. 5,382,728, which discloses a solvent basically consisting of a hydrocarbon composition comprising saturates, alkylbenzenes and polyaromatics. The basically hydrocarbon composition of U.S. Pat. No. 5,382,728 has an excellent dissolving power of the asphaltenes and a good, but still not completely satisfactory, solubilization kinetics of the asphaltenes.

It has now been found that a composition comprising a greater part of hydrocarbons and a smaller part of nitrogenated heterocyclics allows a more rapid dissolution of asphaltenes.

In accordance with this, the present invention relates to a process for the dissolution of asphaltene sediments in oil wells which consists in introducing a solubilizing composition for the above asphaltenes into the oil wells, characterized in that the solubilizing composition comprises:

(a) a basically hydrocarbon fraction consisting of at least 70%, preferably at least 80% by weight, of aromatic and alkyl aromatic hydrocarbons, the alkyl group being from $C_1$ to $C_4$;

(b) a fraction basically consisting of quinoline and isoquinoline as such or alkyl substituted, preferably as such, the alkyl group being from $C_1$ to $C_4$; the weight ratio between fraction (a) and (b) being from 97.5/2.5 to 75/25, preferably from 97/3 to 90/10.

The term aromatic and alkyl aromatic hydrocarbons refers to aromatic hydrocarbons having one or more aromatic rings, possibly condensed with each other, as such or substituted with $C_1$ to $C_4$ alkyl or $C_4$ alkylene groups. This definition therefore comprises benzene, naphthalene, anthracene, phenanthrene, tetrahydronaphthalene, pyrene and the relative $C_1$–$C_4$ alkyl derivatives.

The complement to 100 of fraction (a) basically consists of saturated or unsaturated or cycloaliphatic hydrocarbons, in other words of hydrocarbons in which there is no aromatic ring, and compounds containing heteroatoms, in particular nitrogen, sulfur and oxygen, excluding however quinoline and isoquinoline. In any case the total content of these heteroatoms must be such that their sum is less than 4% by weight of fraction (a).

The composition of the present invention can be prepared by the simple mixing of (a) and (b), or, preferably, fractions or distillates can be used, deriving from industrial processes (crude oil, petrochemical, carbochemical refining) which satisfy the above conditions, i.e. which have the established content of aromatics and quinoline and/or isoquinoline. In this case fractions (a) and (b) form part of a single fraction which is industrially accessible.

For example the fraction called "Wash Oil" (WO) deriving from the distillation of coal tar, which in itself contains a certain content of quinoline (usually from 5 to 10% by weight), has proved to be particularly effective. The product called WO has an initial distillation point (ASTM D2887) of between 198° and 210° C., a final distillation point of between 294° and 310° C., with 50% which distills at a temperature lower than 230° to 250° C. (CAS number: 309-985-4; EINEX number: 101896-27-9).

The wash oil can be used as such, or another quinoline or isoquinoline can be added as required.

Various basically hydrocarbon fractions which are industrially available can be used as fraction (a).

For example the dequinolated fraction of WO and the gas oil cut obtained from fuel oil from steam cracking, a prevalently aromatic residue of the production of ethylene or light olefins by the steam cracking of virgin naphtha and/or gas oil, can be used as component (a).

Another fraction (a) suitable for the purpose is "Light Cycle Oil" (LCO) which originates from catalytic cracking processes of vacuum gas oils.

The term LCO, means the fraction which has a boiling point of between 200° and 350° C.

The appropriate quantity of the above nitrogenated heterocycles must obviously be added to these industrial streams which have practically no quinoline and/or isoquinoline, in order to obtain the effective composition of the present invention.

The compositions of the present invention as well as having an excellent solvent power of asphaltenes, are also capable of dissolving the asphaltenes in relatively short times.

The introduction into the wells of the mixture of the present invention is carried out with the methods well-known to experts in the field. It should be pointed out that these techniques usually involve a blockage period of the well, after the introduction of the composition selected for dissolving the asphaltenes. This unproductive period of time is necessary for allowing contact between the asphaltene sediments and the solvent. Using the mixture of the present invention, this dead time is considerably reduced as the mixture of the present invention not only has a high solubility of asphaltenes, but these high solubility values are reached in shorter times than those of traditional solvents.

The dissolution of the asphaltene formations in the wells is carried out by the normal pumping of the composition of the present invention into the formation. The well is subsequently left to rest for a period of several hours and is then flushed.

The following examples provide a better understanding of the present invention.

EXAMPLES

ASPHALTENES

Asphaltene sediments taken during a flushing operation on an oil well were used for the experimental measurements. The sample was then washed with refluxing n-heptane to remove any possible oil adsorbed.

The asphaltene residue has molecular weight values, determined by G.P.C., of $M_w=1550$ and $M_n=1030$, and the following elemental analysis: C=84.37%, H=5.47%, N=0.80%, S=1.86%. In addition the ratio between aromatic Carbons and total Carbons is 0.68.

SOLUBILITY MEASUREMENTS

The solubility curves were obtained by preparing, for each solvent, about ten mixtures with a different content of asphaltene sediment and measuring via spectrophotometry the concentration of the asphaltene component dissolved.

The following operations were necessary for carrying out the measurements correctly:

1. Preparation of the solutions with the known ratio of dissolved asphaltene material to obtain the necessary calibration lines for correlating absorbance and concentration at the three wave lengths selected for effecting the measurements (400, 600 and 800 nm). These solutions were prepared starting from a mother solution obtained by filtering a mixture of about 100 mg of sediment in 100 ml of solvent. As the asphaltene material being measured has a continuous composition and therefore the visible-UV spectrum can depend on the quantity and quality of the material brought into solution, the evaluation of the data relating to the concentration of the product dissolved during the determination of the solubility curves was obtained by values obtained at the three wave lengths.

The wave length range within which the measurements were effected is the widest range possible in relation to the instrumental limits and to the fact that below 400 nm absorptions on the part of the solvents are possible.

In most of the cases considered the calibration lines show an excellent linearity in the range of concentrations examined.

By calculation of linear regression, it is therefore possible to calculate the absorptivity relating to the single wave lengths, which are then subsequently used in calculating the concentrations in the determination phase of the solubility curves.

2. Determination of the solubility curves.

The determination of the solubility curves for evaluating the solvent capacities is carried out by measuring the quantity of asphaltene material brought into solution from mixtures with different sediment-solvent ratios.

Experimentally a series of mixtures was prepared, containing a known quantity of sediment and increasing volumes of solvents. These mixtures were sonicated for 20 minutes and then left under mechanical stirring for one night. The suspension thus obtained was filtered under pressure using syringes equipped with 0.5 µ teflon filters and absorbance measurements were carried out on the filtrate, from which the concentrations of dissolved organic material were obtained.

In this way, the affinity of each solvent with respect to a substrate can be evaluated on the basis of solubility curves, from which the Smax. index can be obtained, i.e. the value of maximum solubility which can be obtained with a certain solvent, independently of the excess of solvent used.

In order to show the efficiency of quinolines in increasing the solubility of asphaltenes, measurements were carried out for determining Smax. using mixtures of toluene-quinoline with a varying quinoline content.

TABLE 1

| Solvent composition (weight %) | | |
|---|---|---|
| Quinoline | Toluene | Smax. (weight %) |
| 0 | 100 | 38.1 |
| 3 | 97 | 55.1 |
| 6 | 94 | 71.3 |
| 10 | 90 | 84 |
| 15 | 85 | 91.1 |
| 50 | 50 | 92.3 |
| 90 | 10 | 92.1 |

The data of table 1 show how increasing quantities of quinoline increase the solubilization capacity of the toluene. It can also be seen that the maximum solubility is reached when the content of quinoline is 20–30%.

SOLUBILITY KINETICS

In these examples the solubility kinetics are provided (carried out at room temperature) by measuring via visible-UV absorption (400, 600 and 800 nm) the concentration of asphaltene material brought into solution over a period of time from sediment test samples (in the form of pellets) immersed in the solvent under examination.

The pellets are prepared by pressing exactly 100 mg of sample with a Perkin-Elmer press at a pressure of 10,000 kg/cm$^2$ to obtain small disks with a diameter of 13 mm and a thickness of 0.7 mm. The above pellets are then placed inside a sample-holder consisting of two metal nets supported by a tripod and immersed in a liter of solvent to be examined.

The ratio sediment/solvent is that for which the level of maximum solubility permitted for each solvent (grams of sediment/liter) should be reached at infinite time.

During the test, the solution is maintained under light stirring with a magnetic anchor to guarantee the homogeneity of the solution, thus avoiding the fragmentation of the pellets.

A first series of solubilization kinetics was carried out with mixtures of toluene quinoline 85/15 by weight and as a comparison with toluene at 100%. The results are shown in Table 2.

TABLE 2

| Time (hrs) | Toluene/quinoline 85/15 Solute (% w) | Toluene 100% Solute (% w) |
| --- | --- | --- |
| 0 | 0 | 0 |
| 0.5 | 6.3 | 7.4 |
| 1 | 12.6 | 10.1 |
| 2 | 32.7 | 12.7 |
| 3 | 45.7 | — |
| 4 | — | 15.5 |
| 5 | 58.1 | — |
| 8 | 64.3 | 18.1 |
| 24 | 72.7 | 21.6 |
| infinite | 91.1 | 38 |

The data of table 2 show the efficiency of the addition of quinoline in the solubilization process of asphaltenes.

Table 3 finally shows the solubilization kinetics of mixtures of 1-methylnaphthalene (MeN) and quinoline (the kinetics of 1-methylnaphthalene as such is given as a comparison) and WO as such (i.e. with a content of quinoline and isoquinoline of 8% by weight) and dequinolated (i.e. with a content of quinoline and isoquinoline of 2% by weight). The WO used is a distillate deriving from the distillation of coal tar. The one used in the experiments had the following distillation curve:

Initial B.P.: 199° C.; 5% volume: 215° C.; 10% vol.: 222° C.; 30% vol: 236° C.; 40% vol: 242° C.; 50% vol.: 253° C.; 60% vol.: 264° C.; 70% vol.: 272° C.; 80% vol.: 278° C.; 90% vol.: 292° C.; 95% vol.: 299° C.; final B.P.: 327° C.

TABLE 3

| Time (hrs) | MeN as such Solute % w | MeN + 3% quin. Solute % w | MeN + 10% quin. Solute % w | MeN + 29% quin. Solute % w | WO as such Solute % w | WO dequin. Solute % w |
| --- | --- | --- | --- | --- | --- | --- |
| 0 | 0 | 0 | 0 | 0 | 0 | 0 |
| 0.5 | 15.1 | 23.8 | 28.8 | 39.9 | 27.8 | 17.4 |
| 1 | 31.7 | 50.7 | 59.9 | 76.8 | 55.4 | 39 |
| 1.5 | 47.7 | 69.7 | 85.5 | >95 | 78 | 58.8 |
| 2 | 63 | 89.7 | >95 | | 92.7 | 76.8 |
| 3 | 87.2 | >95 | | | >95 | >95 |
| 4 | >95 | | | | | |

We claim:

1. A process for the dissolution of asphaltene formations of oil wells which consists in introducing a solubilizing composition for the above asphaltenes into the oil wells, characterized in that the solubilizing composition comprises:

(a) a basically hydrocarbon fraction consisting of at least 70%, of aromatic and alkyl aromatic hydrocarbons, the alkyl group being from $C_1$ to $C_4$;

(b) a fraction basically consisting of quinoline and isoquinoline as such or alkyl substituted, the alkyl group being from $C_1$ to $C_4$;

the weight ratio between fraction (a) and (b) being from 97.5/2.5 to 75/25.

2. The process according to claim 1, characterized in that fraction (a) consists of at least 80% by weight of aromatic and alkyl aromatic hydrocarbons and fraction (b) basically consists of non-substituted quinoline and isoquinoline.

3. The process according to claim 1, characterized in that the weight ratio between fraction (a) and (b) is between 97/3 and 90/10.

4. The process according to claim 1, characterized in that the composition (a)+(b) basically consists of the fraction called Wash Oil deriving from the distillation of coal tar, as such or to which fraction (b) has been added.

5. The process according to claim 1, characterized in that fraction (a) is the gasoil cut of fuel oil from steam cracking.

6. The process according to claim 1, characterized in that fraction (a) is Light Cycle Oil from Fluid Catalytic Cracking (FCC).

7. The process according to claim 1, characterized in that fraction (a) is dequinolated Wash Oil.

8. The process according to claim 2, characterized in that the weight ratio between fraction (a) and (b) is between 97/3 and 90/10.

* * * * *